Nov. 24, 1953     W. S. COREY     2,660,200

UTILITY SERVICE CLAMP

Filed July 19, 1949

INVENTOR:
WILLIAM S. COREY
BY
ATTORNEY

UNITED STATES PATENT OFFICE 2,660,200

UTILITY SERVICE CLAMP

William Spencer Corey, Tujunga, Calif.

Application July 19, 1949, Serial No. 105,567

4 Claims. (Cl. 138—99)

This invention relates to clamps for use on conduits, such as water mains and the like, in cases where it is desired to provide outlets from such conduits or whenever it is found necessary to repair leaks therein.

It is the general object of the invention to provide a simple and conveniently operable utility clamp comprising two interlocking members so constructed that the possibility of leaks through the clamp is substantially eliminated. More particularly it is the object to provide, at the place within the clamp where the outlet from the conduit is to be made, a resilient gasket in the form of the well known O-ring which, when the clamp is assembled and tightened, becomes compressed to form a permanent closure through which the fluid within the conduit cannot leak as it passes into the outlet formed therein. Another object is to provide within such utility clamp, wedge members which at the time the clamp is placed in position on the conduit, serve to seat the members of the clamp in correctly spaced relation to the conduit and to each other.

These and other objects of the invention will become apparent upon perusal of the following detailed description and reference is invited to the accompanying drawings in which a preferred form of the invention is illustrated.

Figure 1:
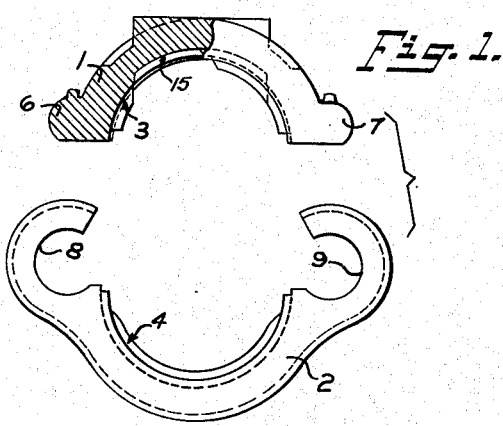
Fig. 1 is an end view of the members of the utility clamp of my invention as they appear before they are mounted in position on a conduit.
Figure 2:
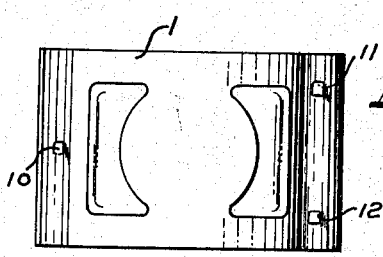
Fig. 2 is a plan view of the upper member of Fig. 1.

As shown in Fig. 1 of the drawings, the numeral 1 denotes the upper clamping member of the invention and 2 represents the lower clamping member thereof. The inner surfaces 3, 4 of these members are cylindrical in shape and of a size to fit loosely about the conduit 5 they are designed to serve. The upper member 1 is provided at the side edges thereof with laterally projecting semi-cylindrical ears 6, 7 which, when the members are initially assembled, ride freely within cylindrical recesses 8, 9, of the lower clamping member. As indicated in Fig. 2, the clamping member 1 is on the upper surface of the ears 6, 7, shown provided with a plurality of bosses 10, 11 and 12 which, as the lower member is hung on the upper member, will contact the inner surfaces of the recesses 8, 9, to maintain substantially uniform clearance between the two members as best indicated in Fig. 5.

Figure 5:
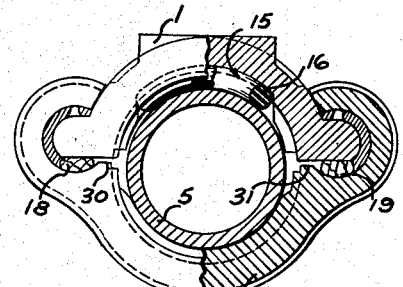
Fig. 5 is an end view partly in section of the clamp as it appears when it is first placed in position on the conduit.
Figure 6:
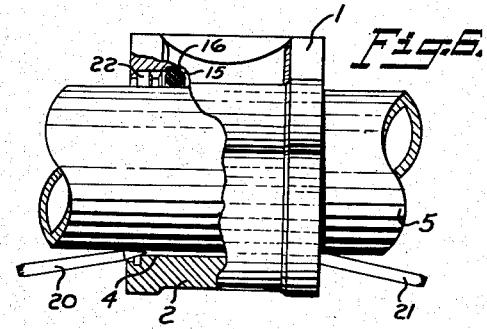
Fig. 6 is a substantially corresponding side view of the device and is added to illustrate the manner in which pressure is applied to draw the clamp tightly in position on the conduit, at the same time to compress the O-ring thereof to provide a tight joint at the place where an outlet is to be cut into the conduit.
Figure 3:
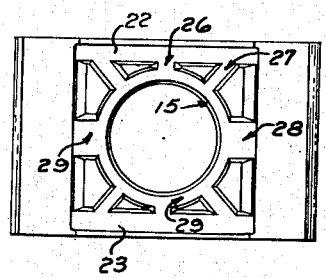
Fig. 3 is an inverted plan view of this member.
Figure 4:
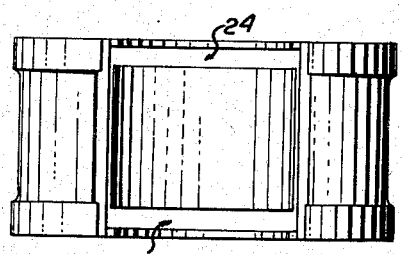
Fig. 4 is a plan view of the lower member thereof.
Figure 7:
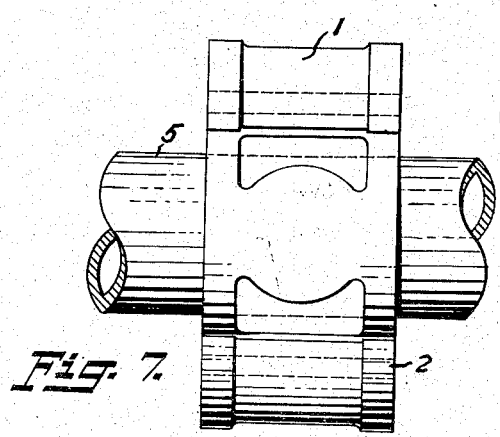
Fig. 7 shows the clamp as it appears when the mounting thereof is completed and the spaces between the clamp and the conduit sealed.

Referring now to Fig. 3, it is noticed that the inner surface of the upper member is, at the center thereof, shown recessed to form a circular seat 15 for an O-ring 16 which comes to rest on the outer surface of the conduit 5 and somewhat compressed when the lower member is hung on the upper member, as indicated in Fig. 5. When thereupon spacing strips 18 and 19 are driven into the spaces between the bottom surfaces of the ears 6, 7, and the inner surfaces of the recesses 8, 9 to press the bosses 10, 11, 12 against the inner surfaces of these recesses, it is found that the members of the clamp become tightly seated on the conduit and that the width of the recesses between the ears and the encompassing ends of the lower clamping member attain the uniformity required for the subsequent lead filling, which will be referred to presently. In order, however, to make certain that the clamp will not be in danger of shifting on the conduit during the subsequent sealing operations of the clamp, I have found it advisable, if not essential, to drive a pair of wedges 20, 21, into the joint between the bottom surface of the conduit and the inner surface of the lower member 2, substantially as indicated in Fig. 6. When these wedges are driven into position, it is found that the clamp becomes so tightly seated on the conduit that it cannot move and further that the O-ring becomes sufficiently compressed to insure a permanent leak-proof joint surrounding the portion of the conduit which subsequently will be drilled to provide the outlet therefrom.

After the clamp in the above described manner has been placed in position on the conduit, it becomes necessary to seal the spaces between the clamp and the conduit with lead in the manner that such clamps are ordinarily sealed. In order to facilitate complete sealing of the member, it is noticed that the members within the end surfaces thereof are made with circular recesses 22, 23, 24 and 25 into which the lead flows from gates conventionally made in soft clay which is laid against the end surfaces of the members and pressed against the cylindrical outer surface of the conduit. Since this manner of providing gates for lead sealing is well known and commonly used in applying surface clamps to conduits, it is not thought necessary further to make mention thereof in this description. The lead flowing into the last named cylindrical recesses is free to flow through a series of passages 26, 27, 28 into the annular space 29 surrounding the O-ring completely to fill this space. The flowing lead will also enter the spaces 30, 31, between the upper and lower member surrounding the spacing elements 18, 19, until arrested by these elements. In such manner it is seen that every unoccupied space within and between the two members will be completely filled with lead. The wedges 20, 21 are then removed.

After the pouring operation has been completed and the lead has been given time to cool off and to set, it is considered good practice to caulk exposed surfaces of the lead so as to make up for any slight shrinkage thereof. This completes the operation of mounting the clamp in position on the conduit and the drilling operation may be performed in any conventionally well known manner.

Since the O-ring has been sufficiently compressed to eliminate all danger of leakage about the outlet from the conduit, the clamp should continue to give satisfactory service during the life of the conduit. As an additional safeguard, however, I prefer to make the locating elements 18, 19 from wood or other suitable material capable of absorbing water and in absorbing water to expand. With these elements in position, it is found that if, due to the vibrations and shocks to which such conduits and clamps ordinarily are subjected, a slight leakage should occur, the leaking water would be absorbed by these elements which would then expand effectively to check such leaks.

From the foregoing description, it will be apparent that I have invented important novel features which will not only provide permanent, rigid support for a service clamp on a conduit but will remain leak-proof during the life thereof under ordinary operating conditions. I do not, however, wish to be limited to the shapes and proportions exactly as illustrated in the drawings, but reserve the right to embody modifications within the scope of the claims hereto appended.

I claim:

1. A clamp for a conduit comprising two arcuate members inter-engageable freely to encompass the conduit, one of the members having laterally projecting ears lodging within recesses of the other member and made with bosses rising from said ears to ride against the surfaces of said recesses thereby correctly to space one member relative to the other, there being a centrally located recess sunk into the inner arcuate surface of said first named member, a resilient annular gasket seated in said recess; and wedges driven into the space between the other member and the conduit to press said bosses against the surfaces of the recesses and to compress the said gasket.

2. A clamp for a conduit comprising two arcuate members inter-engageable freely to encompass the conduit, one of the members having laterally projecting ears lodging within recesses of the other member and made with bosses rising from said ears to ride against the surfaces of said recesses thereby correctly to space one member relative to the other, there being a centrally located recess sunk into the inner arcuate surface of said first named member, a resilient annular gasket seated in said recess, and strips of material insertable between the underside of said ears and the inner surfaces of said recesses to lock the members firmly together about the conduit thereby to cause the conduit to engage and lightly to compress said gasket.

3. A clamp for a conduit comprising two arcuate members inter-engageable freely to encompass the conduit, one of the members having laterally projecting ears lodging within recesses of the other member and made with bosses rising from said ears to ride against the surfaces of said recesses thereby correctly to space one member relative to the other, there being a centrally located recess sunk into the inner arcuate surface of said first named member, a resilient annular gasket seated in said recess, and strips of moisture absorbing moisture expanding material insertable between the underside of said ears and the inner surfaces of said recesses to lock the members firmly together about the conduit thereby to cause the conduit to engage and lightly to compress said gasket.

4. A clamp for a conduit comprising two arcuate members inter-engageable freely to encompass the conduit, one of the members having laterally projecting ears lodging within recesses of the other member, there being a centrally located recess sunk into the inner surface of said first named member, a resilient annular gasket seated in said recess to bear against the outer surface of the conduit, and wedges detachably driven into the space between the other member and the conduit to compress said gasket.

WILLIAM SPENCER COREY.

References Cited in the file of this patent

UNITED STATES PATENTS

| Number | Name | Date |
|---|---|---|
| 2,296,968 | Wirz | Sept. 29, 1942 |
| 2,492,507 | Tipton | Dec. 27, 1949 |